Jan. 15, 1929.
E. A. FORSBERG
1,699,286
PROCESS OF SEPARATING PARAFFINOUS CONSTITUENTS
FROM FLUID HYDROCARBONS
Filed June 28, 1927
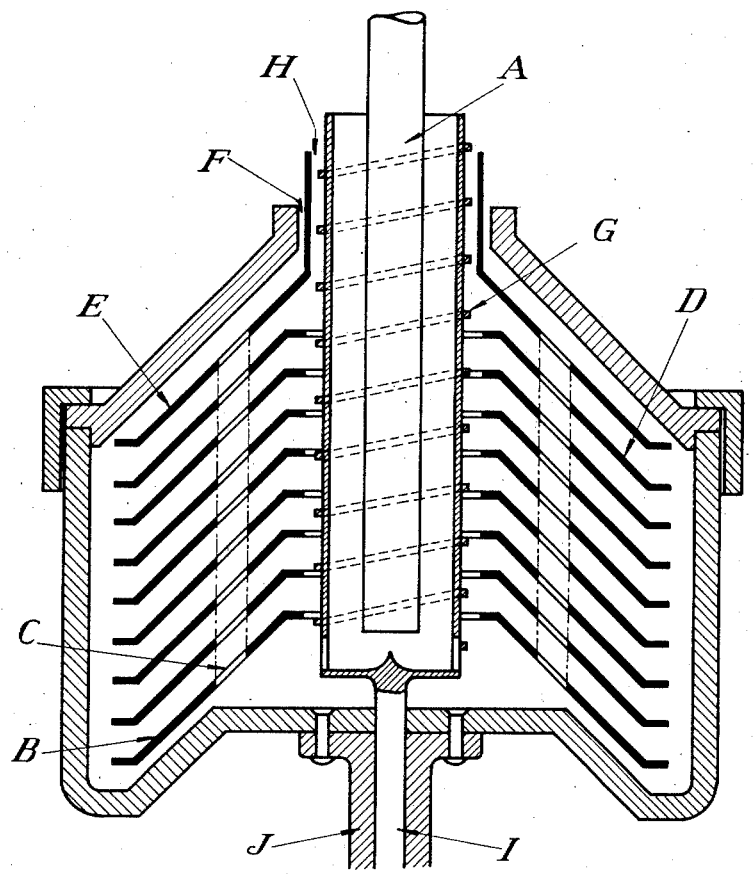
INVENTOR
Erik August Forsberg
BY
ATTORNEYS.

Patented Jan. 15, 1929.

1,699,286

UNITED STATES PATENT OFFICE.

ERIK AUGUST FORSBERG, OF STOCKHOLM, SWEDEN, ASSIGNOR TO AKTIEBOLAGET SEPARATOR-NOBEL, OF STOCKHOLM, SWEDEN, A CORPORATION OF SWEDEN.

PROCESS OF SEPARATING PARAFFINOUS CONSTITUENTS FROM FLUID HYDROCARBONS.

Application filed June 28, 1927, Serial No. 202,064, and in Sweden August 24, 1926.

In the treatment of fluid hydrocarbons, such as mineral oil, it is often necessary, at some stage of their treatment, to remove therefrom such hydrocarbons as will, with sufficient cooling, precipitate in solid form. For example, in the production of lubricating oils from crude mineral oil, it is necessary, at some stage of the process, to remove the paraffins, in order to obtain lubricating oils with a low cold test.

The different known ways of removing such hydrocarbons usually involve cooling the oil to such a temperature that the paraffinous constituents precipitate in solid form and can be removed from the fluid hydrocarbon constituent by filtering, or by gravity settlement or centrifugal separation.

The filtration process is open to well recognized serious objections, which have been overcome by later developed methods of centrifugal separation. For certain kinds of paraffins, the centrifugal separation can be carried out continuously in centrifuges of usual construction; but with other kinds of paraffin (the so-called crystalline or hard paraffins), new difficulties arise, the most serious of which is that the paraffin, being the heavier constituent, and therefore separating at the periphery of the bowl, cannot, on account of its viscosity, be discharged through the ordinary outlets.

One very recently developed process intended to overcome this difficulty involves the addition to the paraffinous oil of a liquid having a specific gravity substantially higher than the paraffin and which is soluble in the fluid hydrocarbons, the liquid being added in sufficient amount to form with the fluid hydrocarbons a solution having a specific gravity higher than that of the paraffin. The paraffin thus does not remain the heavier component but becomes the lighter component. In the centrifugal operation, therefore, the paraffin flows, not out toward the periphery, but in toward the center. It has been found, however, that though thereby the discharge of the paraffin is much facilitated, it nevertheless frequently accumulates at the center of the bowl, on account of its internal friction, and ultimately clogs the outlets.

The present invention is an improvement on the last named process and has for its object to prevent the accumulation of paraffin at the center of the bowl and insure its continuous discharge under all conditions.

To this end the invention comprises the known continuous process of separating the paraffin as a lighter constituent, supplemented by mechanical force adapted to co-operate with the displacing force, incidental to centrifugation, to effect a positive, certain and continuous expulsion of the paraffin.

The treatment of the oil before centrifugation may, or may not, include a cooling step, and may, or may not, include the addition of a light viscosity-reducing diluent, such as gasoline, naphtha, benzine or benzol; but it necessarily involves the addition of a liquid of high specific gravity, such as trichlorethylene, tetrachlorethylene, carbon tetrachloride and similar organic compounds, which is soluble in the fluid hydrocarbon, and preferably of low boiling point, in sufficient proportion to provide a solution which is of substantially higher specific gravity than the paraffin. It is not necessary that the added dense solvent shall not be soluble with the paraffin at high temperature so long as it is relatively insoluble therewith at the temperature of centrifugation.

The process is not dependent for its execution on any specific construction of centrifugal bowl. The drawing is a longitudinal sectional view of a bowl, or preferred construction, adapted to carry out the process.

The mixture of the solution (of fluid hydrocarbons and heavy diluent) and other hydrocarbons (typically paraffin, which, on cooling, precipitates in solid form) is fed to the bowl through the feed tube A into the chamber under the bottom disc B, whence it is distributed to the frusto-conical spaces between the discs D through the vertically aligning series of holes C. In these spaces, the separation occurs in the well known manner. The heavier component, in this case the solution of the heavy diluent with the oil, flows out toward the periphery of the bowl, while the lighter component, in this case the paraffin (with or without diluent), flows toward the center. The heavier component separated at the periphery flows up and outside the top disc E to the outlets F.

In the central chamber of the bowl is provided a tubular member carrying a screw G and rotatable by means of a shaft I, which may conveniently have its bearing within the driving shaft J of the bowl. The shafts I and J rotate at differential speeds by driving means not shown. The screw G may rotate at a higher speed, or at a lower speed, and the difference in speeds may be greater or less; these factors depending on the direction and pitch of the screw. It is not intended to even exclude a possible arrangement that would permit or require the rotative speed of the screw G to be zero or in which the screw would turn in a direction opposite to that of the bowl. The only requirement is that the differential rotative movement, with a selected direction and pitch of screw, shall be such that the screw will act to mechanically force the separated paraffin toward the outlet H inside the neck of the top disc E. Thereby clogging of the bowl is avoided and a continuous discharge of paraffin is insured.

The discs C, D, E may have any shape known in the art. In fact, any known means of dividing the bowl space into lamina or strata may be utilized. Indeed, an open bowl may be operative, especially if it be of not too great diameter and if it be rotated at sufficient speed.

It should also be understood that the execution of the process is not limited to the employment of a screw for supplying the mechanical force required to insure the transportation of the paraffin from the center of the bowl to and out the bowl outlet; the process, as hereinbefore stated, not requiring, for its execution, the use of any particular mechanical instrumentality.

My process, in addition to being applicable to the separation of paraffins from paraffine-containing materials, such as crude oils, distillates and residues, is also applicable to other analogous processes such as the refining or purification of the paraffin-concentrates.

Where, in the claims, I specify trichlorethylene, I mean to include other organic compounds of the same group.

Having now fully described my invention, what I claim and desire to protect by Letters Patent is:

1. The process of separating from fluid hydrocarbons other hydrocarbons which, on cooling, precipitate in solid form, which comprises adding to the mixture a liquid having a specific gravity higher than that of the heaviest of said other hydrocarbons and which is adapted to form a solution with said fluid hydrocarbons and is not adapted to form a solution to a substantial extent with said other hydrocarbons, such liquid being added in a sufficient proportion to form with said fluid hydrocarbons a solution having a specific gravity higher than that of said other hydrocarbons, feeding the mixture to a field of centrifugal force and there centrifugally separating the heavier and lighter components, substantially continuously discharging the heavier component from the field of centrifugal force, and supplementing the force, incidental to centrifugal separation, tending to discharge the lighter component, by a mechanical transporting force sufficiently strong to insure the substantially continuous discharge of the lighter component.

2. The process of separating paraffin from mineral oil which comprises adding to the mixture trichlorethylene in sufficient amount to form a solution of fluid oil and trichlorethylene of higher specific gravity than the paraffinous constituent, feeding the mixture to a field of centrifugal force and there separating the heavier solution from the lighter paraffinous constituent and continuously discharging the heavier solution, and supplementing the force, incidental to centrifugal separation, tending to discharge the paraffinous constituent, by a mechanical transporting force sufficiently strong to insure the substantially continuous discharge of the paraffinous constituent.

3. The process of separating from fluid hydrocarbons other hydrocarbons which, on cooling, precipitate in solid form, which comprises adding to the mixture a liquid having a specific gravity higher than that of the heaviest of said other hydrocarbons and which is adapted to form a solution with said fluid hydrocarbons and is not adapted to form a solution to a substantial extent with said other hydrocarbons, such liquid being added in a sufficient proportion to form with said fluid hydrocarbons a solution having a specific gravity higher than that of said other hydrocarbons, subjecting a body of the mixture to a rapid movement of rotation while feeding a stream of the mixture thereto and substantially continuously discharging the heavier component from the periphery of the rotating body, and applying to the lighter component at the central part of the body a mechanical force operating in the direction of the axis of the rotating body and also operating rotatively at a speed different from that of the body to insure the substantially continuous discharge of the lighter component from the central part of the rotating body.

In testimony of which invention, I have hereunto set my hand, at Stockholm, Sweden, on this 14th day of June, 1927.

ERIK AUGUST FORSBERG.